W. ULBRICH.
SEED CORN RACK.
APPLICATION FILED MAR. 21, 1908.
911,923.
Patented Feb. 9, 1909.
2 SHEETS—SHEET 1.
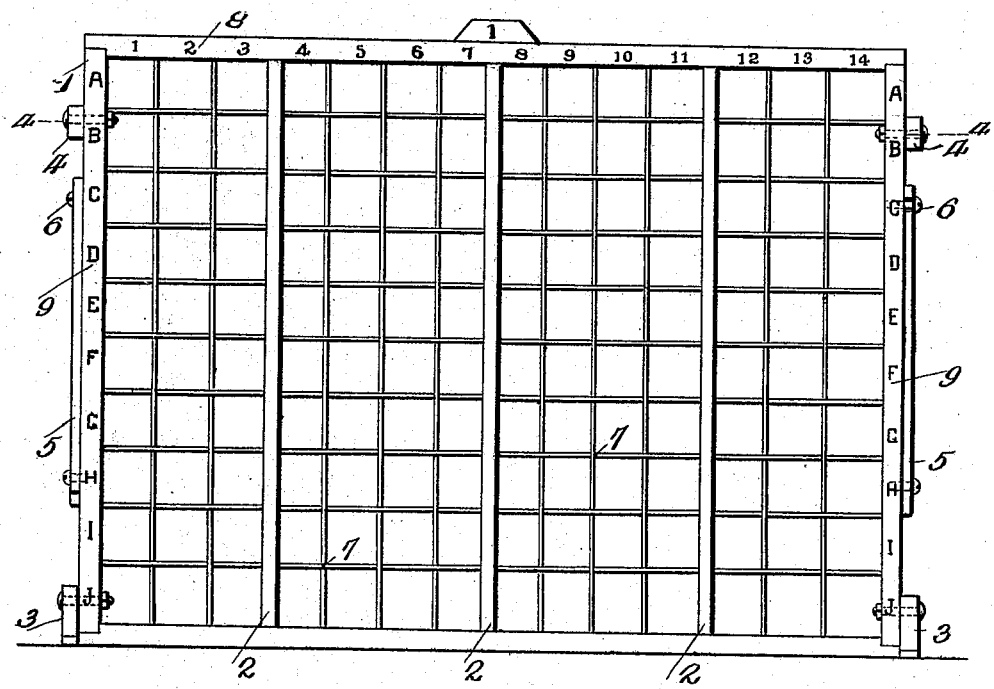
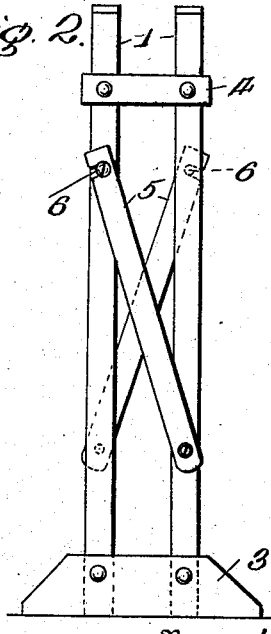

W. ULBRICH.
SEED CORN RACK.
APPLICATION FILED MAR. 21, 1908.
911,923.
Patented Feb. 9, 1909.
2 SHEETS—SHEET 2.
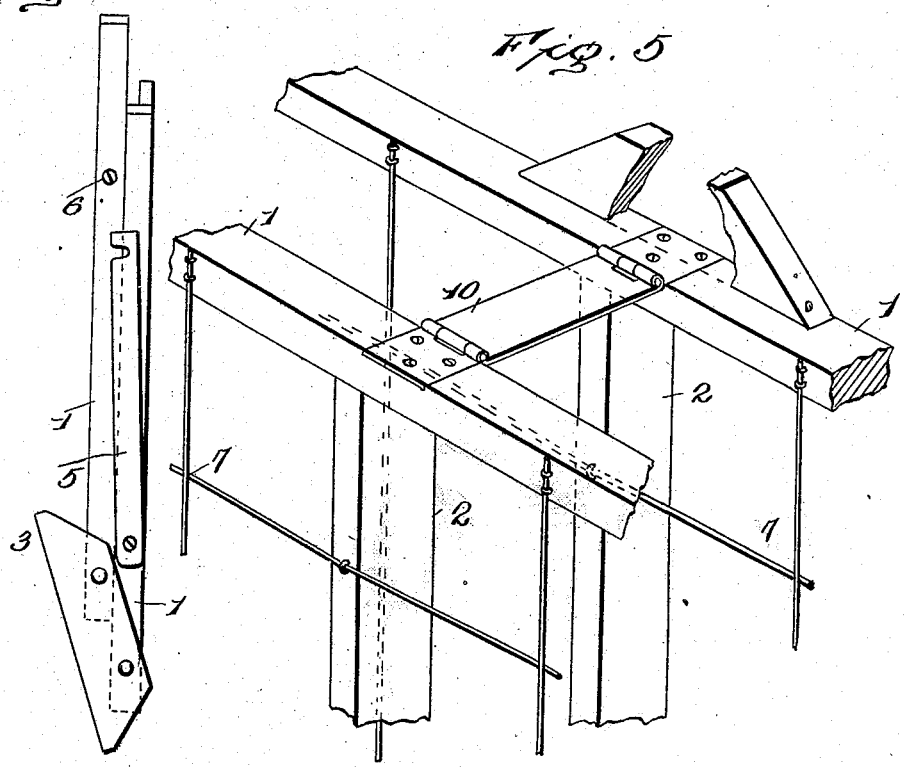
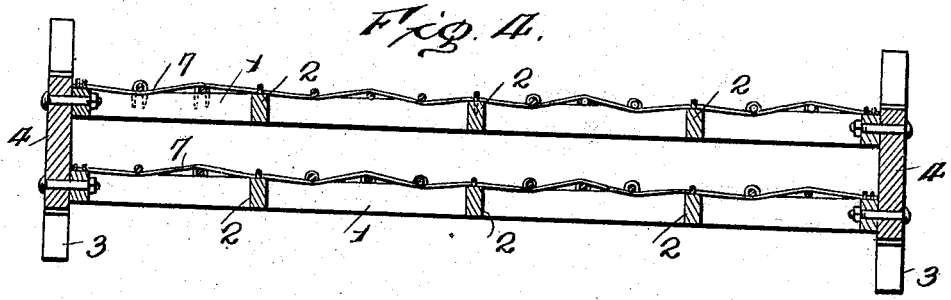
Witnesses
Inventor
William Ulbrich
By
Attorneys

UNITED STATES PATENT OFFICE.

WILLIAM ULBRICH, OF ATLANTIC, IOWA.

SEED-CORN RACK.

No. 911,923.     Specification of Letters Patent.     Patented Feb. 9, 1909.

Application filed March 21, 1908. Serial No. 422,523.

*To all whom it may concern:*

Be it known that I, WILLIAM ULBRICH, citizen of the United States, residing at Atlantic, in the county of Cass and State of Iowa, have invented certain new and useful Improvements in Seed-Corn Racks, of which the following is a specification.

The present invention relates to an improved rack for seed corn and the like, and aims to provide a simple and inexpensive device of this character which is peculiarly designed so as to be readily collapsed when not in use and stored in a comparatively small amount of space.

The rack is particularly adapted for use in connection with apparatus for testing the germinating qualities of seed corn and embodies means whereby the various ears of corn can be designated by distinctive characters according to their position upon the rack.

The invention also contemplates a rack in which the various ears of corn are held out of contact with each other and are supported in such a manner as to permit a free circulation of air around the same and thereby insure a thorough and uniform drying of the corn.

For a dull description of the invention and the merits thereof and also to acquire a knowledge of the details of construction and the means for effecting the result, reference is to be had to the following description and accompanying drawings, in which:

Figure 1 is a side elevation of a seed corn rack embodying the invention. Fig. 2 is an end view of the same showing the rack in the position assumed when in use. Fig. 3 is a similar view showing the rack when folded. Fig. 4 is a horizontal sectional view through the rack on the line 4—4 of Fig. 1. Fig. 5 is an enlarged detail view of the upper portion of a rack showing a modification.

Corresponding and like parts are referred to in the following description and indicated in all the views of the drawings by the same reference characters.

In general the rack comprises a pair of upright frames which can be folded against each other or locked in spaced relation when in use, the said frames being provided with corresponding supports for retaining the ears of seed corn.

Specifically describing the present embodiment of the invention the numerals 1 designate the frames which are of similar construction and are shown as rectangular in shape. These frames are reinforced by the upright braces 2 which may be of any desired number according to the size of the rack.

The opposite ends of the frames 1 have the lower portions thereof pivotally connected by the base pieces 3, the extremities of the base pieces projecting laterally beyond the rack on both sides thereof so as to hold the same securely in an upright position when the rack is in use. It will also be observed that the upper portions of the opposite end of the frames 1 are pivotally connected by link members 4, the said link members and base pieces permitting the frames to be folded together or moved into a spaced relation when in use. For the purpose of locking the frames in spaced relation oppositely inclined hook members 5 are provided at the two ends of the frames, each of said hook members being pivoted to one of the frames and detachably engaging the stud 6 upon the opposite frame. Each of the frames is provided with means for supporting the corn which is disposed transversely with respect to the frames, the said supporting means of the two frames being arranged in coöperative relation to each other. In the present instance these supports are constituted by wire netting 7 applied to the frames, the openings in the netting being of a sufficient size to receive the corn and being in alinement with each other upon the two frames so as to receive the corn. This netting 7 may be either of woven or soldered wire as may be found most desirable.

As previously stated this rack is designed to be employed in connection with apparatus for testing the germinating qualities of the seed corn and for this purpose it is essential that means be provided whereby the various ears of corn can be designated by distinctive characters according to their position upon the rack.

As shown on the drawing the openings in the netting 7 are arranged in vertical and horizontal rows, the vertical rows being designated by the numerals upon one of the frames 1 as indicated at 8 while the horizontal rows are designated by the letters of the alphabet as indicated at 9. It will thus be apparent that the position of each ear of seed corn can be accurately determined when the numeral designating the vertical row and the letter designating the horizontal row are known.

In the larger sizes of racks it may be found desirable to provide braces at intermediate portions in the lengths of the frames 1, and as shown in Fig. 5 these braces 10 have their opposite ends hinged to the frames so as not to interfere with the folding thereof. When the corn is in position upon the rack the various ears are supported by the netting in such a manner as to be held out of contact with each other and a free circulation of air is permitted around the same which insures a thorough and uniform drying of the corn.

Having thus described the invention, what is claimed as new is:

1. In a rack for seed corn and the like, the combination of spaced upright frames loosely connected so as to be collapsed when not in use, oppositely inclined members for locking the frames in a spaced position, and coöperating supports carried by the two frames for receiving the corn.

2. In a rack for seed corn and the like, the combination of spaced upright frames adapted to be folded against each other, means for locking the frames in a spaced relation, and netting applied to the frames for receiving the corn.

3. In a rack for seed corn and the like, the combination of a pair of spaced upright frames, base pieces pivotally connecting the frames, link members pivotally connecting the frames to permit of the same being collapsed, means for locking the frames in a spaced position, and netting applied to the frames to support the corn.

4. In a rack for seed corn and the like, the combination of a pair of spaced frames, base pieces pivotally connecting the frames, link members pivotally connecting the frames, oppositely inclined members for locking the frames in a spaced position, and netting applied to the frames for supporting the corn.

In testimony whereof I affix my signature in presence of two witnesses.

WILLIAM ULBRICH. [L. S.]

Witnesses:
E. L. SMITZ,
WALTER H. SCHEEL.